(12) United States Patent
Ishii (10) Patent No.: US 8,331,010 B2
(45) Date of Patent: Dec. 11, 2012

(54) MIRROR DEVICE WITH FLAT AND SMOOTH MIRROR SURFACE WITHOUT PROTRUSION OR DIP

(75) Inventor: Fusao Ishii, Menlo Park, CA (US)

(73) Assignee: Silicon Quest Kabushiki-Kaisha (JP)

( * ) Notice: Subject to any disclaimer, the term of this patent is extended or adjusted under 35 U.S.C. 154(b) by 628 days.

(21) Appl. No.: 12/460,206

(22) Filed: Jul. 14, 2009

(65) Prior Publication Data

US 2010/0033800 A1 Feb. 11, 2010

Related U.S. Application Data

(63) Continuation-in-part of application No. 11/136,041, filed on May 23, 2005, now Pat. No. 7,304,783, and a continuation-in-part of application No. 11/183,216, filed on Jul. 16, 2005, now Pat. No. 7,215,460.

(51) Int. Cl.
*G02B 26/00* (2006.01)
*G02B 26/08* (2006.01)
*G02F 1/29* (2006.01)

(52) U.S. Cl. ........................................ 359/290; 359/298

(58) Field of Classification Search .......... 359/290–292, 359/298
See application file for complete search history.

(56) References Cited

U.S. PATENT DOCUMENTS

| 5,650,881 | A | | 7/1997 | Hornbeck |
| 5,703,728 | A | * | 12/1997 | Smith et al. ................ 359/871 |
| 6,200,646 | B1 | * | 3/2001 | Neckers et al. ............. 427/510 |
| 7,068,415 | B2 | * | 6/2006 | Mushika ..................... 359/291 |
| 7,183,618 | B2 | | 2/2007 | Ishii |
| 2007/0127110 | A1 | | 6/2007 | Pan |
| 2008/0018983 | A1 | | 1/2008 | Ishii et al. |

* cited by examiner

*Primary Examiner* — Joseph P Martinez
*Assistant Examiner* — Brandi Thomas
(74) *Attorney, Agent, or Firm* — Bo-In Lin (57) ABSTRACT

This invention discloses a mirror device comprises a mirror array. The mirror array includes multiple mirror elements. Each element comprises a mirror supported on a hinge. The hinge is attached directly to the mirror and is substantially perpendicular to the mirror. The hinge penetrates a bottom surface of the mirror with a hinge-top buried in a layer of the mirror beneath a top surface of the mirror.

15 Claims, 8 Drawing Sheets

MIRROR DEVICE WITH FLAT AND SMOOTH MIRROR SURFACE WITHOUT PROTRUSION OR DIP

This application is a Non-provisional Application claiming a Priority date of Jul. 15, 2008 based on a previously filed application Ser. No. 12/009,389 filed on Jan. 17, 2008 for that has a Priority Date of May 12, 2007 according to a Provisional Patent Application 60/930,151. The application Ser. No. 12/009,389 is a Continuation in Part (CIP) Application of another U.S. patent application Ser. No. 10/918,677 filed on Aug. 14, 2004 and now issued into U.S. Pat. No. 7,183,618. The disclosures made in these patent applications filed by the same Applicant of this Non-Provisional Application are hereby incorporated by reference in this patent application. This application is further a Continuation-in-Part Application of two previously filed application Ser. No. 11/136,041 filed on May 23, 2005 (now issued into U.S. Pat. No. 7,304,783) and application Ser. No. 11/183,216 filed on Jul. 16, 2005 (now issued into U.S. Pat. No. 7,215,460). The disclosures made in these Applications as filed by the same Application of this Application are further incorporated by reference.

TECHNICAL FIELD

This invention relates to manufacturing process in applying the mechanical electrical micro-machining system (MEMS) technology and the improved device configurations by applying the manufacturing processes. More particularly, this invention relates to manufacturing processes in producing the Micromirror or Micro-window devices with flat mirrors with smooth mirror surface or windows without any protrusions or dips. This invention is particularly advantageous because the micromirrors may be implemented in a high performance image display system to achieve a high quality of image display with high contrast.

BACKGROUND ART

Even though there are significant advances made in recent years on the technologies of manufacturing and implementing the display devices with moving elements such as micromirrors (reflective device) or micro-windows (transmissive device) as spatial light modulator. There are still technical limitations and difficulties in the manufacturing process. There is a difficulty in a process of making flat mirrors or windows without any mark, protrusion or dip, because a hinge is attached to these moving elements.

Figure 1:
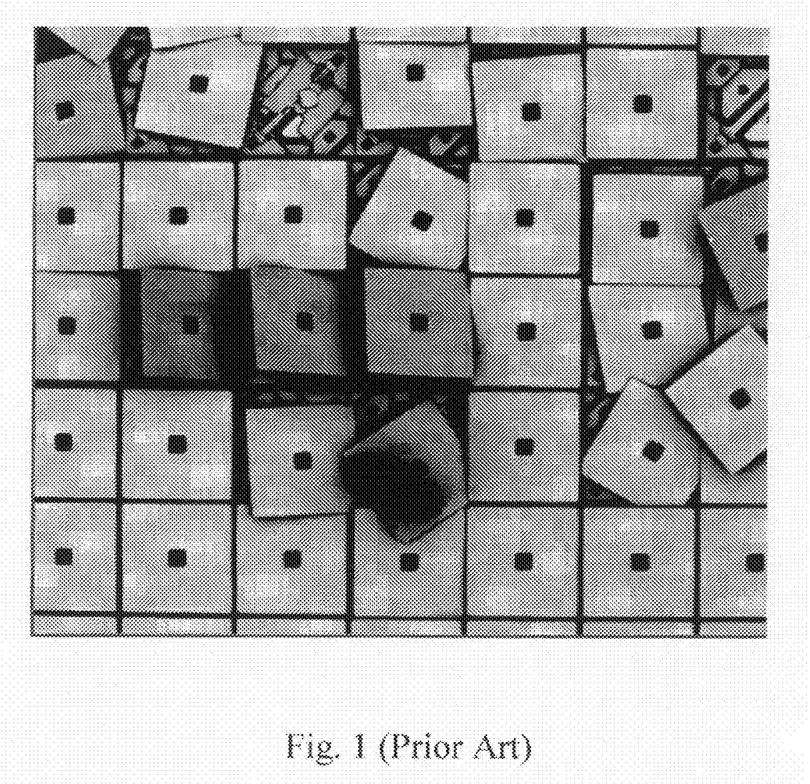
FIG. 1 is a top perspective view for illustrating a dip or hole at the center of the micromirrors produced by conventional MEMS manufacturing process.

MEMS devices have drawn considerable interest because of their application as sensors, actuators and display devices. MEMS devices often have a structure as shown in FIG. 1 where an electronic circuit is formed on a substrate and the circuit provides voltage or current to electrodes or senses voltage or current from the electrodes. MEMS structures are often formed over the top or close to the electrodes with a gap between the electrodes and MEMS structure. The top view shown in FIG. 1 illustrates a typical conventional micromirror device with each mirror formed with a hole in the middle of mirror. The uneven or non-uniform mirror surfaces of a mirror device implemented in the conventional image display system adversely affects the quality of display because of undesired reflection of incoming light by the holes, dips or protrusions on the non-uniform mirror surfaces.

Therefore a need still exists in the art of applying MEMS technologies for manufacturing electronic and optical components and devices to provide a method and material to produce flat mirrors and windows without leaving any hole, protrusion or dip.

SUMMARY OF THE INVENTION

An aspect of this invention is to provide new and improved structures for MEMS devices and manufacturing processes to produce mirror device comprises micromirror arrays with flat and smooth mirror surface such that the above discussed limitations and difficulties can be resolved.

Another aspect of this invention is to provide new and improved structures for MEMS devices and manufacturing processes to enable convenient manufacturing processes of hinges and flat and smooth mirror surfaces to reduce the production costs and to provide mirrors that can achieve high level of performance.

Another aspect of this invention is to provide new and improved structures for MEMS devices and manufacturing processes to enable convenient manufacturing processes and to provide stable structures by preventing metal migration to cause hinge deformation.

Another aspect of this invention is to provide new and improved structures for MEMS devices and manufacturing processes to manufacture hinges and mirrors with flat and smooth mirror surfaces wherein the hinge is supported on a hinge base higher than the electrode whereby the hinge base can serve the function as mirror stoppers and the potential problems of insulation layer breakdown on the electrodes are resolved.

Another aspect of this invention is to provide new and improved structures for MEMS devices and manufacturing processes to manufacture hinges and mirrors by etching the sidewall of semiconductor and polishing the surface after filing the hole with a sacrifice layer to form vertical hinges followed by etching the sacrificial layer with the hinge protruding over the sacrificial layer. Then the metal layer is deposited to form the mirror surface over the protruding hinge. A flat and smooth mirror surface is formed because the hinge is so thin compared with the thickness of the mirror and the hinge is buried in the mirror surface without leaving any noticeable marks on the surface of the mirror.

Another aspect of this invention is to provide new and improved structures for MEMS devices and manufacturing processes to enable convenient manufacturing processes and to provide stable structures by forming migration stop layer with Titanium or AL2O3 for preventing metal migration from the hinge base to the hinge and to the electrodes to prevent both the hinge deformation and electrode degradation.

DETAILED DESCRIPTION OF THE PREFERRED EMBODIMENTS

Figure 2:
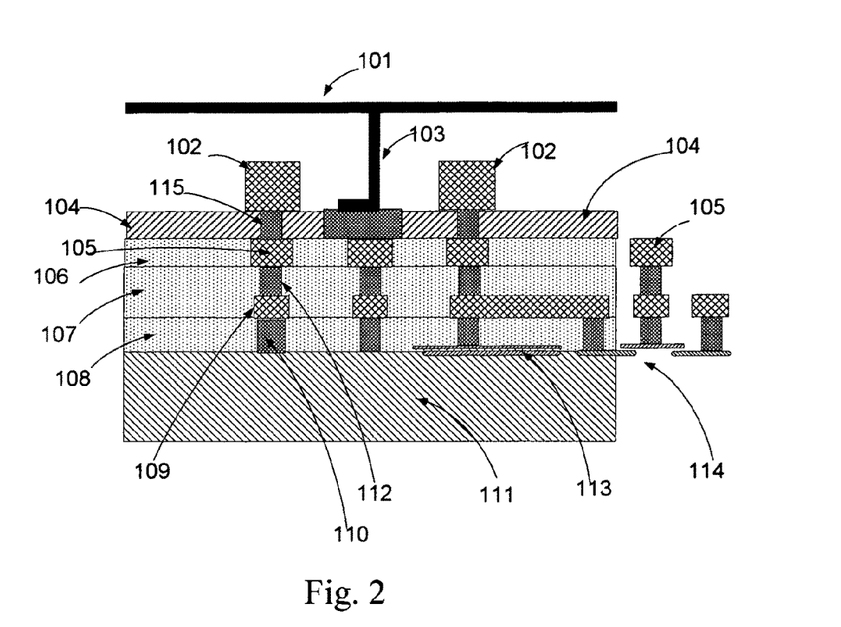
FIG. 2 shows a side cross-section view of a micromirror element as an embodiment of this invention.

FIG. 2 is a cross sectional view for illustrating a micromirror manufactured by applying a MEMS technology as exemplary embodiment of this invention. The micromirror includes a mirror 101 supported on a hinge 103. The mirror 101 is formed as an aluminum surface has a flat and smooth top surface without a hole, dip or protrusion. The hinge 103 is formed as a semiconductor hinge, such as a silicon hinge. The hinge 103 has a foot, shown as a reversed L-shaped foot, supported on an insulation layer 104.

The mirror element further includes two electrodes 102 disposed on two opposite sides of the hinge 103 underneath the mirror 101. The electrodes 102 are connected to signal wires 105 and 109 through via connectors 110, 112, and 115 penetrate through the inter-layer dielectric (ILD) layers 106, 107 and 108. The micromirror element is supported and manufactured on a semiconductor substrate 111 such as a silicon substrate. There are also junction layers 113 and 114 formed during the COMS manufacturing processes.

The signal wires 105 and 109 may be configured as word lines and bit lines to transmit control signals for applying voltages to the electrodes 102 to control the deflection of the mirror 101. The electrodes may also serve the function as the mirror stopper to contact and stop the mirror 101 at a pre-defined maximum deflection angles. As will be further described below, a top portion of the hinge 103 is embedded in a bottom layer of the mirror 101 through a special manufacturing process as illustrated and described in FIGS. 11A to 11C.

Figure 3:
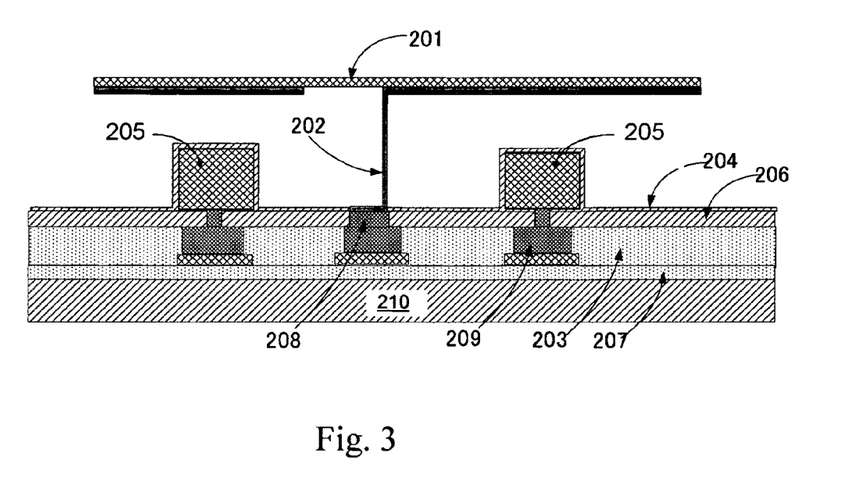
FIG. 3 shows a side cross section view of a micromirror element of this invention with a hinge foot and a metal mirror deposited on top of a semiconductor hinge forming a one-piece structure.

FIG. 3 is a side cross sectional view of a micromirror element as another embodiment of this invention. The micromirror element includes a flat mirror 201 supported on a semiconductor hinge 202 includes a foot and a mirror platform supporting the mirror 201 thereon. The micromirror element further includes two electrodes 205 supported on two etch stop layers 204 and 206. The electrodes 205 are connected to electric wires through via connectors 208 penetrated through the etch stop layers 204, 206 and the inter-layer dielectric (ILD) layer 203. The ILD layer 203 is supported on a semiconductor substrate 210 and disposed on top of an insulting layer 207.

FIG. 3A is a photographic view of the micromirror device. Even though the configuration as shown in FIG. 3 has the advantage of successfully sealing the holes in the mirror 201, there is still a dip on the surface of the mirror and the surface of the mirror may be deformed to have warped shape as shown in FIG. 3A.

Figure 4:
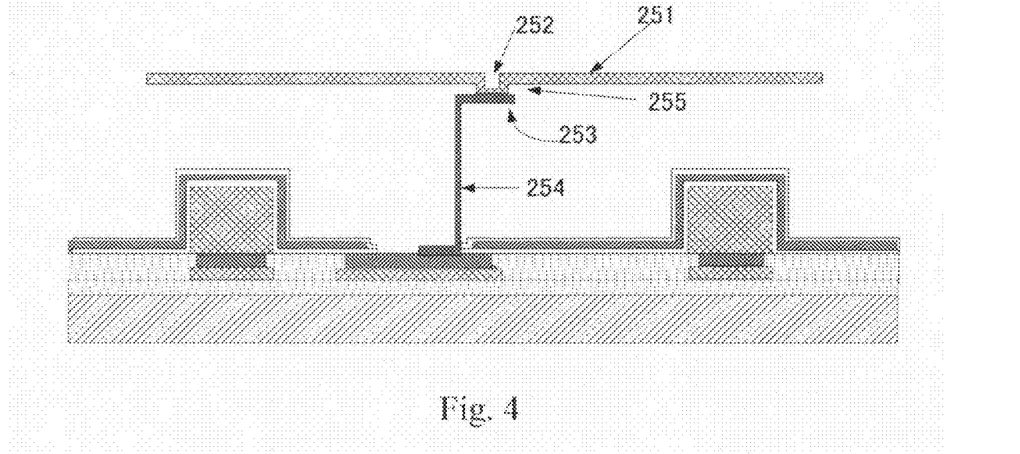
FIG. 4 shows a side cross section view of a micromirror element of this invention with a hinge-tab and a mirror-via formed with material of the mirror metal.

FIG. 4 is a side cross sectional view of a micromirror element as another embodiment of this invention. The micromirror element includes a mirror 251 supported on a semiconductor hinge 254 includes a foot and a hinge tab 253. The mirror tab 253 supports the mirror 251 through a mirror via 255 surrounding a mirror hole 252 to contact the hinge tab 253. The mirror via 255 is composed of a mirror material such as aluminum and the mirror via 255 is placed on the hinge tab 253.

The micromirror element shown in FIG. 4 resolves the difficulties of mirror surface warping due to mirror surface deformation as that encountered in the micromirror element of FIG. 3. But the mirror 251 has a via-hole 252 and the light reflected from the edges and corners of the hole can degrade quality of the image display.

Figure 5:
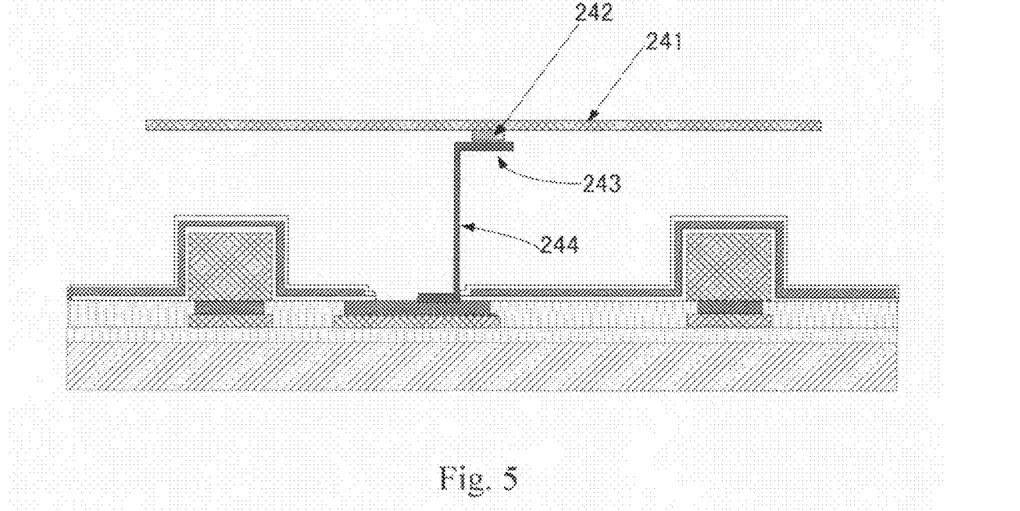
FIG. 5 shows a side cross section view of a micromirror element of this invention with a hinge-tab and a mirror-via formed with a different material than the mirror material and applying a polish process to planarize the surface.

FIG. 5 is a side cross sectional view of a micromirror element as another embodiment of this invention. The micromirror element includes a mirror 241 supported on a semiconductor hinge 244 includes a foot and a hinge tab 243. The hinge tab 243 supports the mirror 241 through a mirror via 242 formed by filling a via-hole, e.g., a mirror via-hole 242 as that shown in FIG. 4. The mirror via-hole 242 is filled with a material composed of a conductive material and planarized by applying a polishing process. This micromirror element has that benefits that the difficulties of surface warping and a hole on the surface of the mirror are resolved. However, the micromirror element shown in FIG. 5 requires more manufacturing processing steps thus adversely affecting the production costs.

Figure 6A:
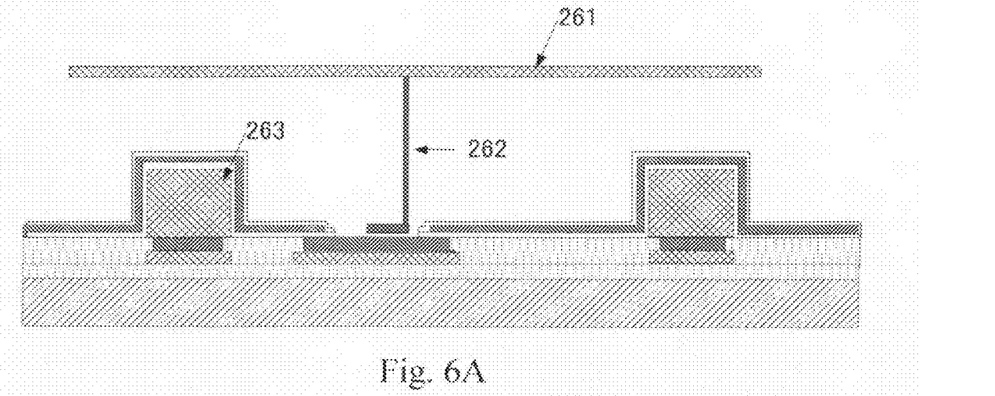
FIGS. 6A and 6B show the side cross section views of a micromirror element of this invention with a smooth and uniform mirror surface manufactured by a simplified manufacturing process.
Figure 6B:
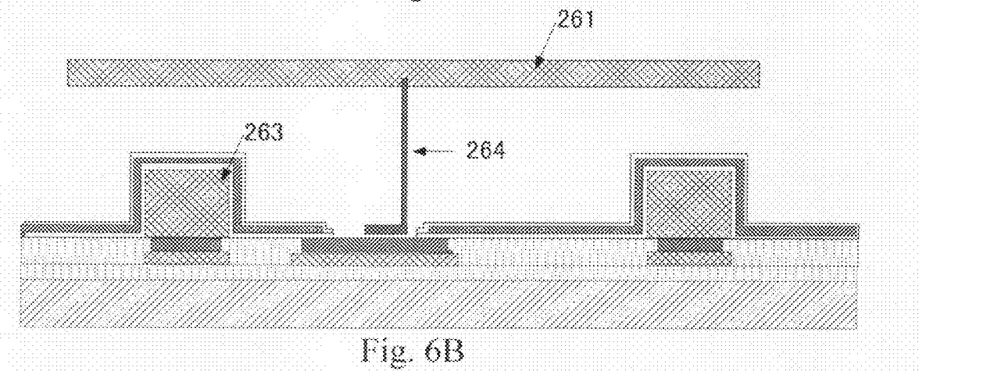

FIG. 6A is a side cross sectional view of a micromirror element as another embodiment of this invention. The micromirror element includes a mirror 261 supported on a semiconductor hinge 262. The hinge 262 attaches directly onto the mirror 261 to support the mirror 261 controlled by two electrodes 263 to deflect to different deflection angles when the electrodes 263 disposed on a semiconductor substrate are applied different voltages. FIG. 6B has a similar structure with FIG. 6A except that the hinge 264 in FIG. 6B penetrates through the bottom surface of the mirror 261 and attached to a buried layer in the mirror 261. The bottom layer of the mirror may comprise an etch stop layer composed of a semiconductor material. According to the manufacturing processes as disclosed below in FIGS. 11 and 12, it is preferable that the mirror is protected by an etch stop layer composed of a semiconductor material. The depth of the penetration into the mirror may range from a depth below 100 Angstroms to approximately 5% and up to two-third ($2/3$) of the thickness of the mirror. The hinge 262 is attached directly to the bottom surface of the mirror 261 and not penetrating into the mirror 261 beyond the bottom surface of the mirror 261. This micromirror element has the benefits that the difficulties of surface warping and a hole on the surface of the mirror are resolved. Furthermore, the micromirror element shown in FIG. 6 can be manufactured by simplified manufacturing processing steps thus reducing the production costs.

Figure 7:
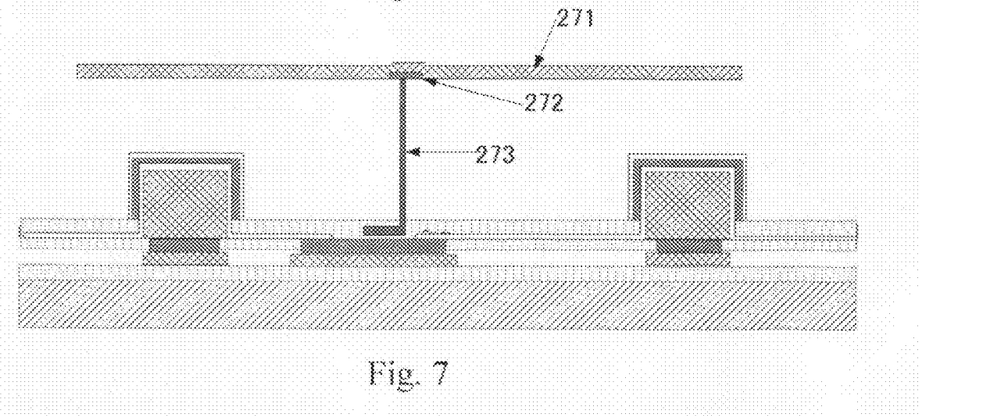
FIG. 7 shows a side cross section view of a micromirror element of this invention with a migration stop layer to stop the migration of mirror metal into semiconductor hinge.

FIG. 7 is a side cross sectional view of a micromirror element as another embodiment of this invention. The micromirror element includes a mirror 271 supported on a semiconductor hinge 273. The hinge 273 supports the mirror 271 through a migration stop layer 272 formed between the mirror 271 and the hinge 273 to prevent the migration of the mirror material into the hinge. The migration stop layer thus prevents the deformation of the hinge 273 caused by migration of mirror material to the hinge. The migration layer may be a Ti (titanium) layer. Preferably, a migration layer is formed on all the interface areas between a semiconductor hinge and a metal layer.

Figure 8:
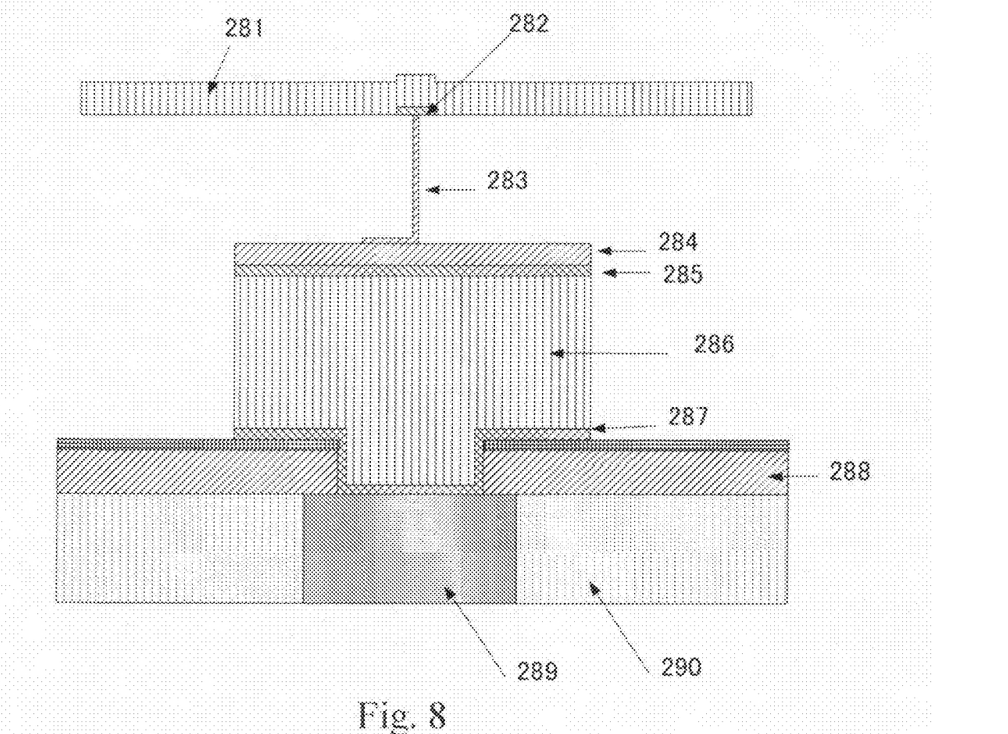
FIG. 8 shows a side cross section view of a micromirror element of this invention with a migration stop layer to stop the migration of mirror metal into semiconductor hinge and a hinge base to implement a shorter hinge.

FIG. 8 is a side cross sectional view of a micromirror element as another embodiment of this invention. The micromirror element includes a mirror 281 supported on a hinge 283. The hinge 283 supports the mirror 281 through a migration stop layer 282 formed between the mirror 281 and the hinge 283 to prevent the migration of the mirror material into the hinge. The migration layer thus prevents the deformation of the hinge 283 caused by migration of mirror material to the hinge.

The hinge is supported on a hinge base 286 covered with a barrier metal layer 285 under a second migration stop layer 284 for contacting and supporting the foot of the hinge 283. The second migration stop layer 284 prevents a migration of the material of the hinge base 286, e.g., a hinge base composed of aluminum, to migrate to the hinge 283. The hinge base 286 is placed on top of an inter-layer dielectric (ILD) layer 290 through a third migration layer 287 and an etch stop layer 288. The third migration layer 287 prevents migration of the material of hinge base, e.g., a hinge base formed with aluminum, to adjacent layers thus affecting the electric conductivity as well causing mechanical deformation. A via-hole 289 is opened through the ILD layer 290 for electrically connecting the hinge-base to electrical wiring (not specifically shown). The migration layers, e.g., layer 282, 284 and 287, may be a Ti (titanium) layer. Preferably, a migration layer is formed on all the interface areas between a semiconductor hinge and a metal layer and between the metallic hinge base 286 and the etch stop layer 288.

Figure 9:
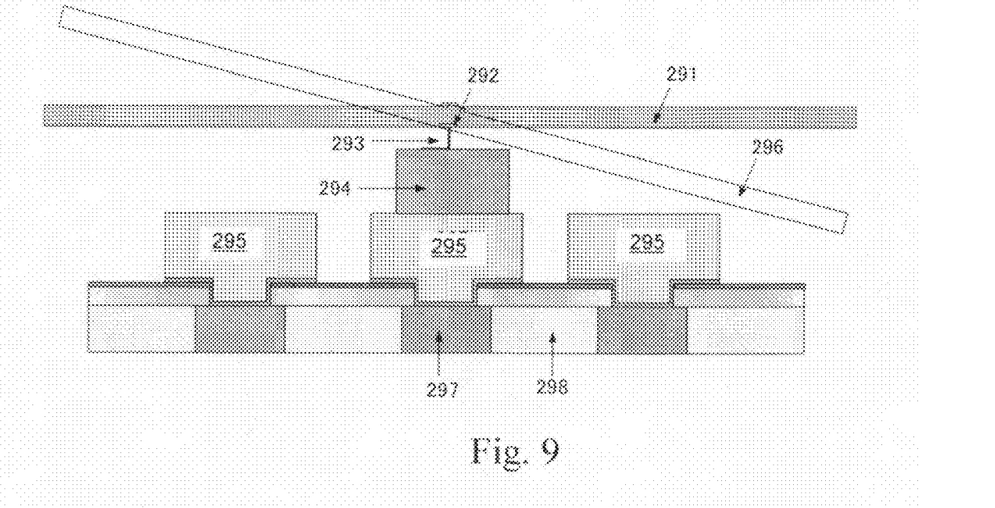
FIG. 9 shows a side cross section view of a micromirror element of this invention with a shorter hinge extended from a hinge base that is higher than the electrodes accomplished by adding an additional via on top of the hinge-base that has the same height as the electrodes.

FIG. 9 is a side cross sectional view of a micromirror element as another embodiment of this invention. The micromirror element includes a mirror 291 when operated in a horizontal state and 296 when tiled to a pull-in state. The mirror 291 is supported on a hinge 293 and the hinge is supported on a hinge base 294 placed upon one of three electrodes 295 on top of an inter-layer dielectric (ILD) layer 298. The electrodes 295 have via connecters 297 opened through the ILD layer 298 connected to ground or power lines (not specifically shown here).

This embodiment is to provide a structure wherein the mirror 291 is prevented from contacting the electrodes with voltages applied thereon. Instead of contacting the electrode, the mirror 296 is tilted to contact the hinge base 294. The mirror contacts the hinge-base 294 that is connected to a ground potential where no voltage is applied. This configuration prevents damage to the insulation layer covering the electrode when the mirror continuously deflects to a maximum angular position to contact the electrodes during multiple mirror oscillations to the fully-on or fully-off positions. The hinge base is connected to a ground potential and can be implemented to function as mirror stoppers to stop the mirror at the predefined maximum deflection angles on opposite side of mirror operations without concerns of the breakdown of the insulation layers.

Figure 10:
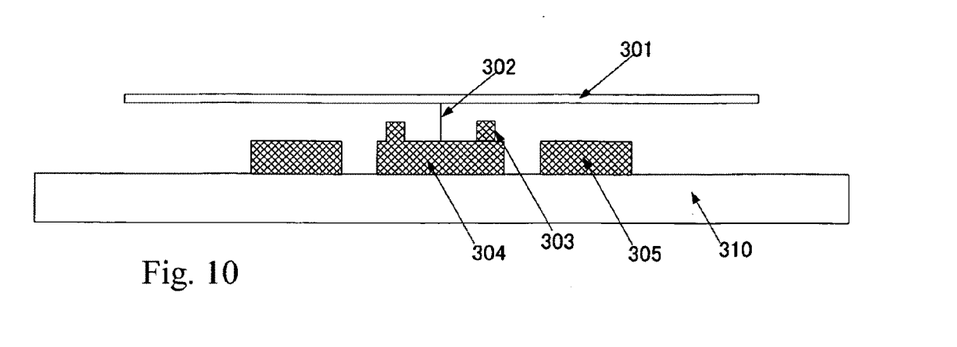
FIG. 10 is a cross sectional view for showing an alternate embodiment of this invention wherein the hinge base includes tow horns to serve the function as mirror stopper.

FIG. 10 is a side cross sectional view of a micromirror element as another embodiment of this invention. The micromirror element includes a mirror 301 supported on a hinge 302. The hinge 302 is supported on a hinge base 304 functions as an electrode with two adjacent electrodes 305 disposed on top of an inter-layer dielectric (ILD) layer (not specifically labeled). The hinge base 304 further includes two mirror-tilt-stoppers 303 on the top surface of the hinge base 304 on two opposite sides of the hinge 302. The mirror-tilt-stoppers 303 stop the mirror when the mirror 301 is controlled to deflect to the maximum deflection angles that can be either fully-on or fully-off angular positions. This configuration also has the benefit of preventing a breakdown of the insulation layer insulating the electrodes 305 when these electrodes are also implemented as stopper to continuously contact and stop the mirror at the maximum deflection angles.

Figure 11A:
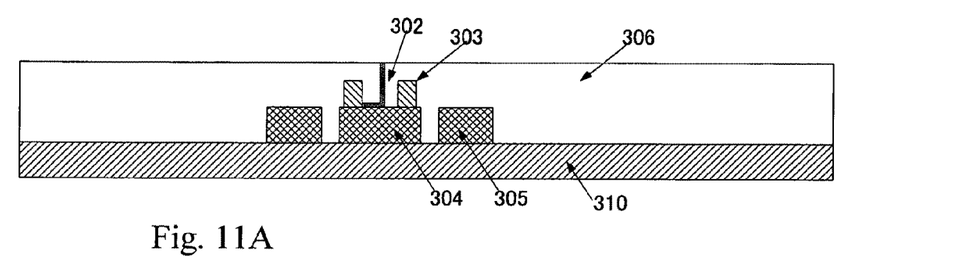
FIGS. 11A to 11C are a series of cross sectional view to illustrate the manufacturing processes for making a mirror device of this invention.
Figure 11B:
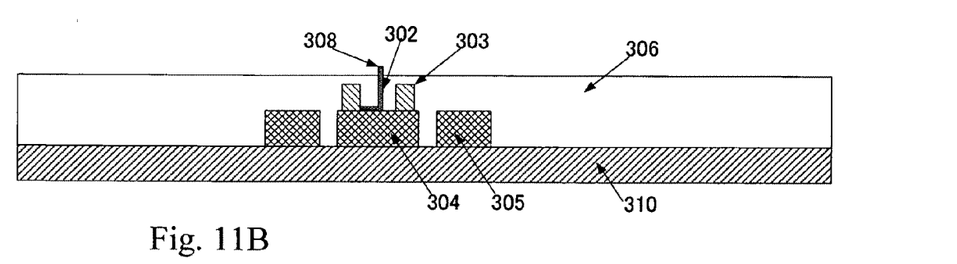
Figure 11C:
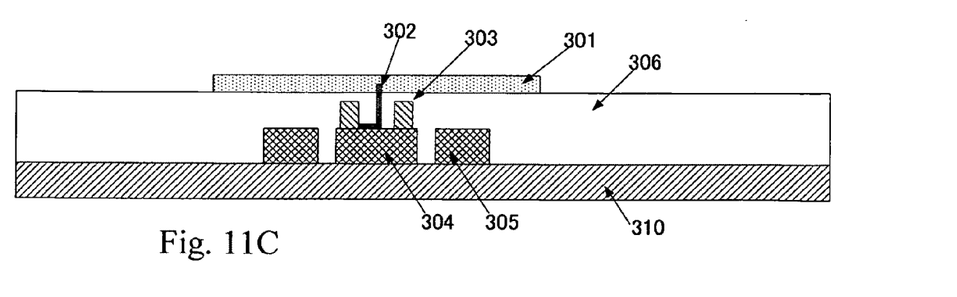

FIGS. 11A to 11C are a series of cross sectional views to illustrate the processing steps for manufacturing a mirror device of this invention. FIG. 11A shows a supporting substrate 310 that comprises a semiconductor substrate and ILD layer supported thereon (not specifically shown) with via holes (not specifically shown). The supporting substrate 310 has a first and a second electrode 305 and a hinge base 304 with a first and a second horn 303 on two opposite sides of a hinge 302 formed thereon. The hinge 302, the hinge base 304 and the electrode 305 are all covered by a sacrificial layer 306. A polishing process is applied to ensure the flatness of the hinge 302 and the sacrificial layer 306. In FIG. 11B, a etching process is applied to the top surface of the sacrificial layer 306 to expose a top portion of the hinge 302 extending over and above the top surface of the polished top surface of the sacrificial layer 306. In FIG. 11C, a mirror layer 301 is deposited o top of the sacrificial layer 306. The manufacturing steps proceed with an vapor etching process to remove the sacrificial layer 306 to form a flat and smooth top mirror surface without dip, holes or protrusion on the top surface of the mirror 301. In an embodiment, the hinge 302 penetrates the bottom surface of the mirror 301 and buried in a layer of the mirror 301 below the top surface of the mirror. In a different embodiment, the hinge 302 is attached to the bottom surface of the mirror 301 without any penetration.

Therefore, this invention discloses a device configuration and manufacturing method to provide a flat mirror supported on a vertical hinge without any dip, mark, or hole on the top surface of the mirror. The vertical hinge is formed by the sidewall of a semiconductor and the top surface is polished back after filling the hole with a sacrificial layer. The hinge is not yet protruding above the top surface. Then a polishing etching process is carried out to etch only the top layer of the sacrificial layer, the top portion of the hinge protrudes above the sacrificial layer. Then, the mirror metal is deposited over the protruding vertical hinge. Because the hinge is very thin compared to the thickness of the mirror, the hinge is buried would not leave any noticeable mark on the surface of the mirror.

Figure 12A:
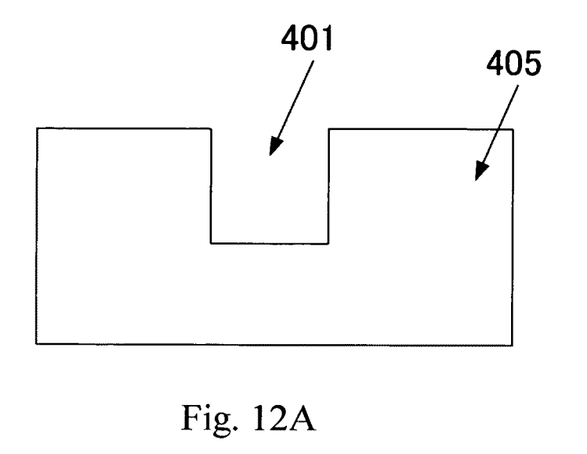
FIGS. 12A to 12G are cross sectional views and perspective views for showing the manufacturing processes to form the hinge on the sidewalls of a cavity.
Figure 12B:
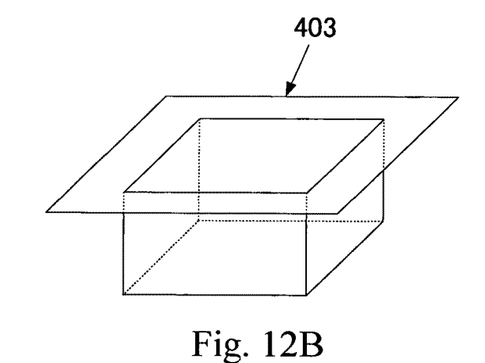
Figure 12C:
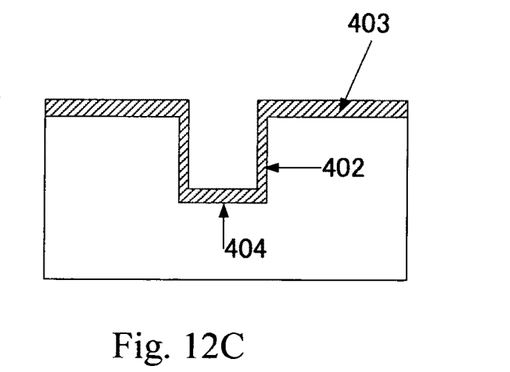
Figure 12D:
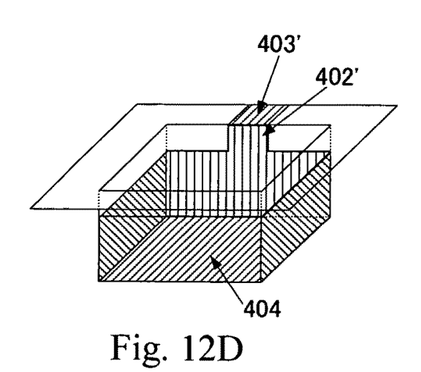
Figure 12E:
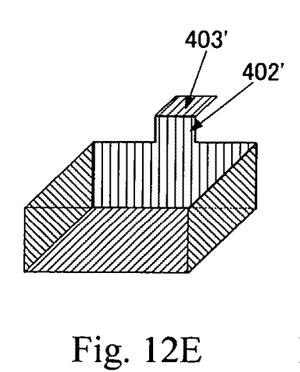
Figure 12F:
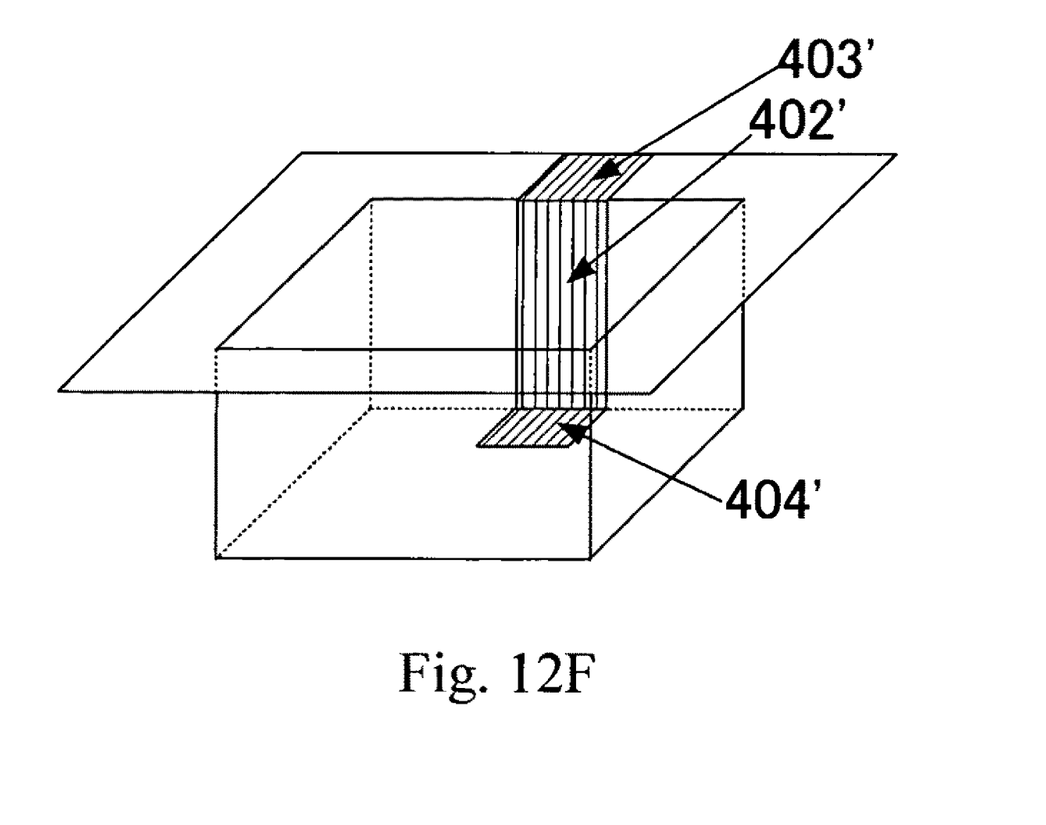
Figure 12G:
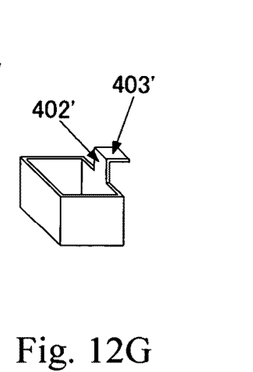

FIGS. 12A to 12F are cross sectional views and perspective views for showing the processing steps to form the hinge of this invention. FIG. 12A is a cross sectional view of a sacrificial layer 405 has a cavity 401 with sidewalls surrounding the cavity 401. In FIGS. 12B and 12C, a layer of hinge material is deposited on the sidewalls 402 and over the top surface 403 of the cavity. In FIGS. 12D and 12E, a vertical hinge 402' is formed by etching the sidewall layer 402 of the hinge material deposited on the sidewalls of the cavity and a tab 403' is formed by etching the layer deposited on the top surface surrounding the cavity 401. In FIG. 12F, a hinge foot 404' is formed by etching and patterning the layer 404 of the hinge material deposited on the bottom surface of the cavity 401 and the bottom of the post. The hinge is then formed by etching off and completely removing the sacrificial layer 405 as that shown in FIG. 12G. According to the manufacturing processes as disclosed in FIGS. 11 and 12, it is preferable that the mirror is protected by an etch stop layer composed of a semiconductor material. In an embodiment, a micromirror of this invention further comprises at least one etch stop layer of Al2O3.

Therefore, according to the manufacturing processes and configuration as disclosed in FIGS. 2 to 12, it is preferable that at least a vertical hinge may also serve the function as an electrode. Furthermore, in an embodiment, the hinge base has a same height as the address electrode. And, in an alternate embodiment, the hinge base has a different height from an address electrode. In this invention, the vertical hinge may be formed as part of a post composed of the same material. Furthermore, the vertical hinge may also have a foot composed with the same material as the vertical hinge.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A mirror device comprising
a mirror array comprises multiple mirror elements;
each element comprises a mirror supported on a hinge;
said hinge is attached directly to said mirror and is substantially perpendicular to said mirror;
said hinge penetrates a bottom surface of said mirror with a hinge-top buried in a layer of said mirror beneath a top surface of said mirror; and
said hinge further comprises a hinge foot extending laterally from said hinge along substantially a horizontal direction wherein said hinge-foot is disposed on a first hinge-base migration stop layer on top of a hinge base for preventing a migration of a hinge base material to said hinge.

2. The mirror device of claim 1 wherein:
said hinge penetrates said bottom surface of said mirror with said hinge-top buried in a sacrificial layer, constituting a layer of said mirror below said top surface of said mirror.

3. The mirror device of claim 1 wherein:
said hinge is electrically connected to a ground potential.

4. The mirror device of claim 1 wherein:
said top surface of said mirror is substantially a flat and smooth mirror surface.

5. The mirror device of claim 1 wherein:
said hinge penetrates said bottom surface of said mirror with said hinge-top buried in a layer with a penetration depth of approximately equal to or greater than 100 Angstroms in said mirror beneath a top surface of said mirror.

6. The mirror device of claim 1 wherein:
said hinge further comprises a migration stop layer disposed on top of said hinge top buried in said layer of said mirror to insulate said hinge from said mirror for preventing a migration of a mirror material to said hinge.

7. The mirror device of claim 1 wherein:
said mirror comprises a aluminum mirror and said hinge comprises a semiconductor hinge.

8. The mirror device of claim 1 wherein:
a top portion of said hinge further penetrates said bottom surface of said mirror with said, hinge-top buried in a layer with a penetration depth of exceeding five percent (5%) and below two-third (⅔) of a thickness of said mirror in said mirror beneath a top surface of said mirror.

9. The mirror device of claim 1 wherein:
said mirror is composed of a metallic material and said hinge is composed of a semiconductor material wherein said hinge and said mirror constitutes a one-piece structure.

10. The mirror device of claim 1 wherein:
said hinge has a hinge top attached directly to bottom surface of said mirror without penetrating a bottom surface of said mirror and said hinge top having no laterally extending horizontal structure.

11. The mirror device of claim 1 wherein:
said hinge base is composed of a conductive material disposed on a hinge via-connector disposed in a via-hole opened through an inter-layer dielectric (ILD) layer deposited on top of a semiconductor substrate.

12. The mirror device of claim 11 further comprising:
a second hinge base migration stop layer disposed between said ILD layer and said hinge base for preventing a migration of said hinge base material to said ILD layer.

13. The mirror device of claim 1 further comprising:
a first and second electrodes disposed on said ILD layer supported on a semiconductor substrate wherein said hinge base has a height extending from said ILD layer higher than said first and said second electrodes to function as a stopper to stop the mirror at a first and second maximum deflection angles respectfully.

14. The mirror device of claim 1 further comprising:
a first and second electrodes disposed on said ILD layer supported on a semiconductor substrate wherein said hinge base further comprises a first horn and a second horn extended from a top surface of said hinge base on two opposite sides pf said hinge wherein said first horn and second horn have a height extending from said top surface of hinge base higher than said first and said second electrodes to function as a stopper to stop the mirror at a first and second maximum deflection angles respectfully.

15. A mirror device comprising:
a mirror array comprises multiple mirror elements;
each element comprises a mirror supported on a hinge;
said hinge is attached directly to said mirror and is substantially perpendicular to said mirror; and
said hinge penetrates said bottom surface of said mirror with said hinge-top buried in a layer with a penetration depth of exceeding five percent (5%) and below two-third (⅔) of a thickness of said mirror in said mirror beneath a top surface of said mirror.

* * * * *